(12) United States Patent
Inbar

(10) Patent No.: US 9,207,517 B2
(45) Date of Patent: Dec. 8, 2015

(54) OPTICAL ISOLATOR

(71) Applicant: Eran Inbar, Tel-Aviv (IL)

(72) Inventor: Eran Inbar, Tel-Aviv (IL)

(73) Assignee: V-Gen Ltd., Tel-Aviv (IL)

( * ) Notice: Subject to any disclaimer, the term of this patent is extended or adjusted under 35 U.S.C. 154(b) by 83 days.

(21) Appl. No.: 14/023,632

(22) Filed: Sep. 11, 2013

(65) Prior Publication Data

US 2014/0071518 A1 Mar. 13, 2014

(30) Foreign Application Priority Data

Sep. 12, 2012 (IL) .......................................... 221918

(51) Int. Cl.
*G02F 1/35* (2006.01)
*H01S 3/00* (2006.01)
*H01S 3/067* (2006.01)
*H01S 3/30* (2006.01)

(52) U.S. Cl.
CPC .............. *G02F 1/353* (2013.01); *H01S 3/0064* (2013.01); *H01S 3/0078* (2013.01); *H01S 3/0092* (2013.01); *H01S 3/067* (2013.01); *H01S 3/302* (2013.01)

(58) Field of Classification Search
CPC ..... G02F 1/353; H01S 3/0078; H01S 3/0092; H01S 3/0064; H01S 3/067; H01S 3/302

USPC .......................................................... 359/327
See application file for complete search history.

(56) References Cited

U.S. PATENT DOCUMENTS

| | | | | |
|---|---|---|---|---|
| 5,272,717 A * | 12/1993 | Stultz | ................................ | 372/3 |
| 5,323,404 A * | 6/1994 | Grubb | ............... | 372/6 |
| 6,434,172 B1 * | 8/2002 | DiGiovanni et al. | ............. | 372/6 |
| 6,731,426 B2 * | 5/2004 | Yeniay et al. | ............ | 359/341.32 |
| 6,980,578 B2 * | 12/2005 | Ramachandran | ............... | 372/92 |
| 6,996,135 B2 * | 2/2006 | Martinelli et al. | ................ | 372/3 |
| 7,936,795 B2 * | 5/2011 | Emori | ................ | 372/3 |
| 8,004,753 B2 * | 8/2011 | Nakai et al. | ................. | 359/337.2 |
| 8,008,865 B2 | 8/2011 | Stack | | |
| 8,472,486 B1 * | 6/2013 | Henry et al. | ........................ | 372/3 |
| 2009/0274175 A1 * | 11/2009 | Kitabayashi et al. | ............. | 372/3 |
| 2010/0045977 A1 | 2/2010 | Puzey | | |
| 2010/0284061 A1 | 11/2010 | Nicholson | | |

* cited by examiner

*Primary Examiner* — Daniel Petkovsek
(74) *Attorney, Agent, or Firm* — Vedder Price P.C.

(57) ABSTRACT

An optical isolator for optically isolating an optical system, the optical system outputting electromagnetic radiation at predetermined ranges of frequencies, the optical isolator including a filter, and a Raman shifter, the filter is optically coupled with the output of the optical system and allows electromagnetic radiation of at least the predetermined ranges of frequencies to pass therethrough, the Raman shifter is optically coupled with the output of the filter for shifting the frequencies of the electromagnetic radiation through Raman scattering, the filter filtering back reflected portions of the shifted frequencies electromagnetic radiation.

9 Claims, 5 Drawing Sheets

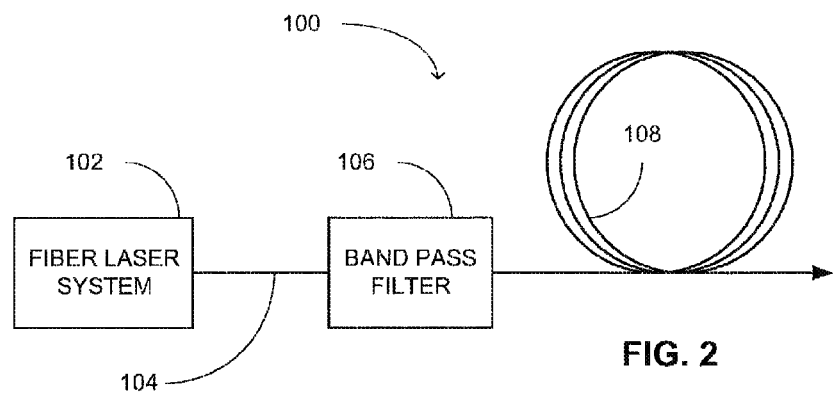
FIG. 2
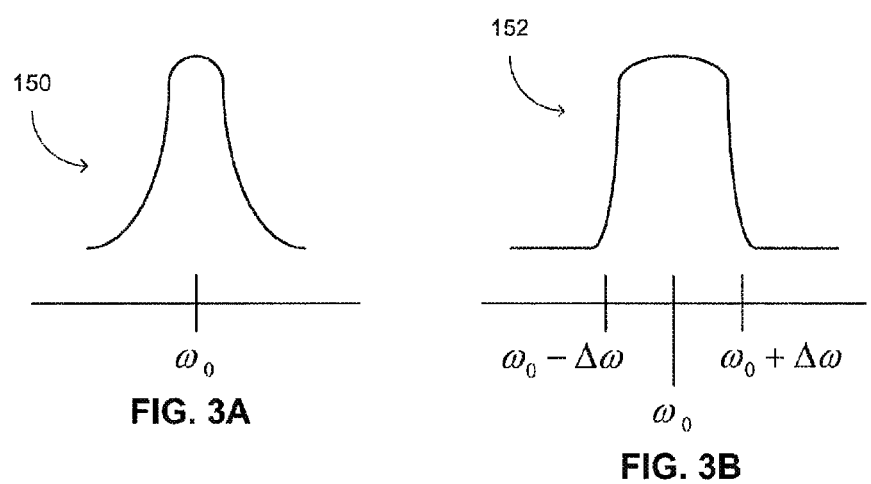
FIG. 3A
FIG. 3B
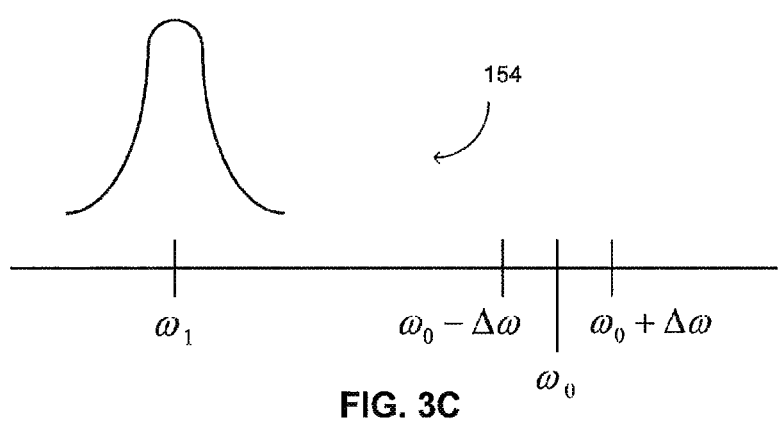
FIG. 3C

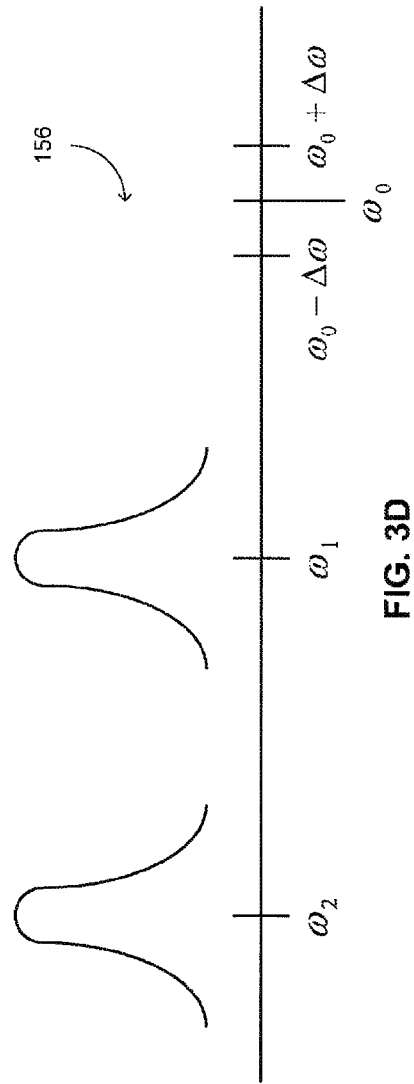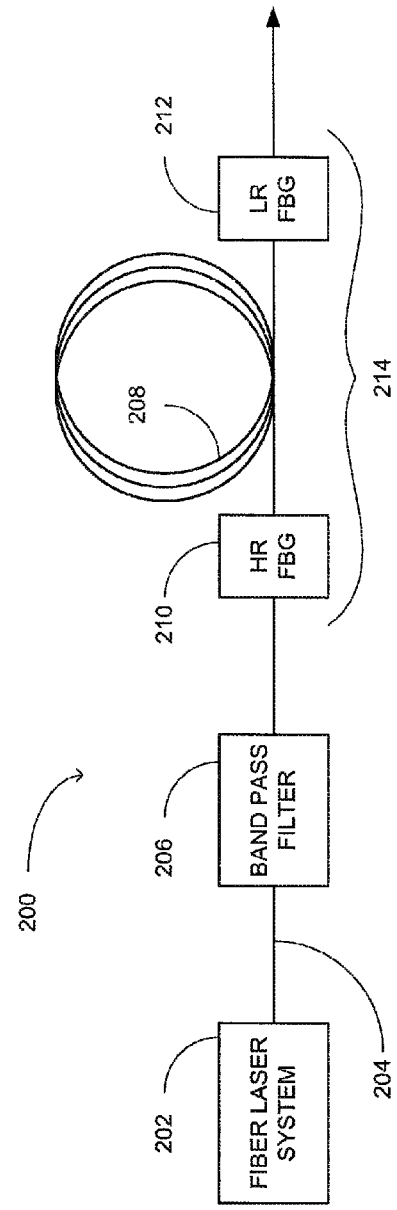

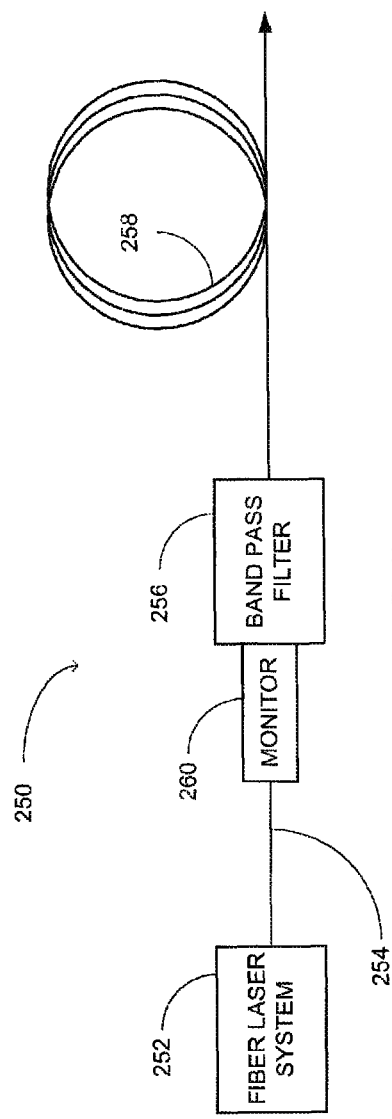

OPTICAL ISOLATOR

CROSS REFERENCE

This application claims priority from Israel Patent Application 221918 filed on Sep. 12, 2012.

FIELD OF THE DISCLOSED TECHNIQUE

The disclosed technique relates to optical isolators, in general, and to methods and systems for producing an optical isolator which shifts the frequency of light radiation passing in a first direction and which filters light radiation passing in a second opposite direction, in particular.

BACKGROUND OF THE DISCLOSED TECHNIQUE

The optical isolator is an optical device which prevents the transmission of light exiting from an optical component or system (e.g., a laser system or an amplifier) back into that optical component or system. That is, an optical isolator prevents back-reflected light from re-entering the optical component or system. Usually, optical isolators allow transmission of light in a single direction and prevent transmission of light in the opposite direction. Back reflected light, which re-enters an optical system might be amplified in an active gain fiber within the optical system and reach high peak power levels in an unregulated manner. The back reflected light can cause damage to any component of the optical system it encounters along the way.

Amplifier chains may contain several isolators between different amplification stages. Thus, optical isolators are further employed for suppressing and stabilizing amplified spontaneous emission, thereby mitigating, at least to some extent, the detrimental effects thereof (e.g., loss of signal peak power and stochastic spiking).

Reference is now made to FIGS. 1A and 1B. FIG. 1A is a schematic illustration of a Faraday optical isolator, generally referenced 10, constructed and operative as known in the art. FIG. 1B is a schematic illustration of a polarization independent Faraday optical isolator, generally referenced 50, constructed and operative as known in the art. Reference is now made to FIG. 1A, which includes a first polarizer 12 (i.e., input polarizer), a faraday rotator 14 and a second polarizer 16 (i.e., output polarizer or analyzer). Faraday rotator 14 is optically coupled between first polarizer 12 and second polarizer 16. First polarizer 12 is polarized vertically. Second polarizer 16 is polarized at 45 degrees.

Faraday rotator 14 is an optical component which rotates the polarization angle of light passing therethrough due to the Faraday Effect. It is noted that the terms "polarization angle" and "polarization direction" are used interchangeably herein below. Faraday rotator 14 is a magneto-optic device, in which light is transmitted through a transparent medium (not shown) and is exposed to a magnetic field. The magnetic field lines are substantially parallel to the direction of the beam of light. The polarization direction of the light is continuously rotated during the passage through the medium of the Faraday rotator 14. The total rotation angle $\beta$ is calculated by the following equation:

$$\beta = VBL, \qquad (1)$$

where V is the Verdet constant of the material, B is the magnetic flux density (in the direction of propagation of the light beam), and L is the length of the rotator medium. It is noted that the Verdet constant exhibits frequency dependence, such that it decreases with the frequency.

Faraday rotator 14 is a non-reciprocal optical propagating component). For example, Faraday rotator 14 rotates the polarization of a light beam passing there-through in a first direction by an angle $\beta$. Suppose that light beam is back-reflected, Faraday rotator 14 does not rotate the polarization of the light beam by an angle of $-\beta$. Instead, Faraday rotator 14 further rotates the polarization of the back-reflected light beam by the angle $\beta$. Thus, the polarization of the back reflected light beam is rotated by an angle of $2\beta$ after passing twice through faraday rotator 14 (i.e., passing once in each direction). In the example set forth in FIG. 1A, Faraday rotator 14 rotates the polarization of light by an angle of 45 degrees. In this manner, the polarization of light passing twice there-through is rotated by ninety degrees.

Optical isolator 10 is a polarization dependent isolator. Polarized beam of light 18A is vertically polarized as shown by corresponding polarization state 24A. Beam 18A passes through first polarizer 12 and remains vertically polarized. In case some portions of beam 18A are not vertically polarized these portions are deflected by first polarizer 12 and do not pass there-through.

Polarization state 24B represents the vertical polarization of beam 18B. Beam 18B enters Faraday rotator 14. Faraday rotator 14 rotates the polarization direction of beam 18B by 45 degrees. Polarization state 24C represents the polarization angle of beam 18C. Beam 18C enters second polarizer 16. The polarization angle of beam 18C corresponds to the polarization angle of second polarizer 16 and therefore beam 18C passes through second polarizer 16 with substantially no losses. Beam 18D exits second polarizer 16. The polarization angle of beam 18D is substantially similar to that of beam 18C, and is represented by polarization state 24D.

At least a portion of beam 18D is back-reflected into isolator 10 as beam 20A. The polarization angle of beam 20A is substantially similar to that of beam 18D. Alternatively, the polarization direction of beam 20A is arbitrary. Beam 20A enters second polarizer 16. Second polarizer 20A filters out any portion of beam 20A which has a polarization direction orthogonal to the polarization direction of second polarizer 16 and of beam 18D (i.e., 45 degrees). Beam 20B exits second polarizer 16 and enters Faraday rotator 14. The polarization angle of beam 20B is substantially similar to that of beam 20A. Faraday rotator 14 rotates the polarization angle of beam 20C by 45 degrees. In this manner, the polarization angle of the entering beam 18A is rotated by ninety degrees after passing twice through Faraday rotator 14. The polarization angle of beam 20C is represented by polarization state 22C. Beam 20C enters first polarizer 12. As the polarization angle of beam 20C is perpendicular to that of first polarizer 12, first polarizer deflects beam 20C. Deflected beam 20D exits first polarizer 12 away from the direction of arrival of beam 18A. In this manner, isolator 10 prevents beam 18A from being back-reflected there-through.

Reference is now made to FIG. 1B, which includes a first polarizer 52 (i.e., input polarizer), a Faraday rotator 54 and a second polarizer 56 (i.e., output polarizer or analyzer). Faraday rotator 56 is optically coupled between first polarizer 52 and second polarizer 56. Each of first and second polarizers 52 and 56, is a birefringent wedge. Faraday rotator 54 is substantially similar to Faraday rotator 14 of FIG. 1A, having a polarization rotation angle of 45 degrees. Optical isolator 50 is a polarization independent isolator, which isolates the optical system from back reflected light regardless of the polarization state of the back-reflected light. That is isolator 50 prevents light, of any polarization state or combination of polarization states, from being back-reflected there-through.

Arbitrary polarized beam of light 58, having arbitrary polarization direction, enters first polarizer 52 at a point of entrance 66. First polarizer 52 separates beam 58 into two orthogonally polarized beams 60A and 60B. Each of beams 60A and 60B enters Faraday rotator 54 and the polarization angle thereof is rotated by 45 degrees. Each of beams 60A and 60B enters second polarizer 56. Second polarizer 56 re-combines beams 60A and 60B back into arbitrary polarized beam 58.

Beam 58 is back-reflected toward isolator 50 as arbitrary polarized beam 62. Beam 62 enters second polarizer 56. Second polarizer 56 separates beam 62 into two orthogonally polarized beams 64A and 64B. Each of beams 64A and 64B enters Faraday rotator 54. Faraday rotator 54 rotates the polarization angle of each of orthogonally polarized beams 64A and 64B by an angle of 45 degrees. Each of beams 64A and 64B enters first polarizer 52. First polarizer 52 diverges beams 64A and 64B, such that each of beams 64A and 64B is back-reflected through isolator 50 with an off-set with respect to point of entrance 66 of beam 58. In this manner, each of beams 64A and 64B is prevented from being back-reflected through the optical path of beam 58.

Ideally the sub-components of a faraday isolator (e.g., beam splitter, faraday rotator) are transparent. However, in practice the sub-components will absorb a small portion of the light passing there-through. This light absorption is termed "parasitic absorption" and is manifested as heating of the sub-components which absorb light.

Optical isolators operating at very high optical power levels, over few hundreds of miliwatts, need to address several issues. For high average optical power levels, parasitic absorption in the Faraday rotator might cause substantial thermal lensing, which distorts the light beam and can also affect the degree of isolation of the optical isolator.

Additionally at very high optical power levels, the Faraday medium of the Faraday rotator should exhibit a high transparency in the spectral region of the passing light beam, a high optical quality (e.g., the uniformity of the material and the parallelism and smoothness of the surfaces), high optical damage threshold and high Verdet constant. As detailed herein above, the rotation of the polarization angle within the Faraday rotator depends on the Verdet constant of the medium, the magnetic flux density, and the length of the rotator medium. For sufficiently rotating the polarization of the passing light beam (i.e., at an angle of 45 degrees), the Faraday rotator requires high magnetic field and long enough medium. The high magnetic field is produced by cumbersome and heavy magnets. The crystals employed as Faraday rotator medium should be long enough (e.g., few centimeters) and have an aperture which is large enough to ensure high optical damage threshold (e.g., a few millimeters), and are therefore expensive.

Raman scattering is inelastic scattering of incident photons which interact with the molecules within a Raman medium. Scattered photons either receive energy from (i.e., anti-Stokes shifted) or lose (i.e., Stokes shifted) energy to the vibrational modes of the optical medium. In this manner, the frequency of the scattered photons is shifted. The frequency shift is related to changes in the vibrational and rotational properties of the molecules of the medium through which the scattering occurs. That is, the energy lost or gained by the scattered photon is gained or lost, respectively, by the scattering molecule in form of vibrational or rotational energy. The scattered Raman photons (i.e., the frequency of which is shifted) can further undergo a second order Raman shift. For example, a first order Raman scattered photon, which energy is decreased with respect to the energy of the original light beam is in-elastically scattered again and its energy is further reduced.

A Band Pass Filter (BPF) is a device that enables passage therethrough to light having a frequency within a certain range of frequencies. The BPF rejects (i.e., absorbs or reflects) light of frequencies outside of that range of frequencies. The range of frequencies passed by the BPF is referred to as the spectral linewidth (i.e., linewidth or bandwidth) of the BPF. The central frequency within the linewidth, at which the attenuation is minimal, is referred to as the transmission line of the BPF.

A Fiber Bragg Grating (FBG) is an optical component that reflects particular wavelengths of light and transmits all others (i.e., a band-block filter). The FBG is constructed of an optical fiber having a periodic variation to the refractive index of the fiber core. The FBG is constructed, for example, from a germanium-doped silica fiber, which is photosensitive, in that the refractive index of the core changes with exposure to UV light. The germanium-doped silica fiber is exposed to UV light for producing periodic variations in the refractive index thereof across fiber.

US Patent Application Publication No. 2010/0045977 to Puzey, Kenneth A., entitled "Methods of Analyzing Samples Using Broadband Laser Light" describes a laser diode with an optical isolator coupled with the output end thereof. The optical isolator includes an acousto-optic cell, which imparts a frequency shift to the light, equal to the frequency applied to the acousto-optic cell. Light reflected back through acousto-optic the cell receives a second additional frequency shift, which is sufficient to prevent undesirable interaction with the laser diode.

SUMMARY OF THE PRESENT DISCLOSED TECHNIQUE

It is an object of the disclosed technique to provide a novel method and system for producing an optical isolator which shifts the frequency of light radiation passing in a first direction and which filters light radiation passing in a second opposite direction. In accordance with an embodiment the disclosed technique, there is thus provided an optical isolator for optically isolating an optical system. The optical system outputs electromagnetic radiation at predetermined ranges of frequencies. The optical isolator includes a filter and a Raman shifter. The filter is optically coupled with the output of the optical system. The filter receives the electromagnetic radiation of predetermined ranges of frequencies from the optical system. The filter allows the electromagnetic radiation of at least the predetermined ranges of frequencies to pass therethrough. The Raman shifter is optically coupled with the output of the filter. The Raman shifter receives the electromagnetic radiation of predetermined ranges of frequencies from the filter. The Raman shifter shifts the frequencies of the electromagnetic radiation through Raman scattering. The filter filters back reflected portions of the shifted frequencies electromagnetic radiation.

In accordance with another embodiment of the disclosed technique, there is thus provided a method for optically isolating an optical system. The method includes the steps of receiving electromagnetic radiation, passing the electromagnetic radiation through a filter, shifting the frequencies of the electromagnetic radiation through Raman scattering, and filtering back reflected portions of the frequencies shifted electromagnetic radiation. The received electromagnetic radiation has a predetermined range of frequencies. The filter allows electromagnetic radiation of at least the predetermined ranges of frequencies to pass therethrough. The frequencies of the electromagnetic radiation are shifted through Raman scattering. The back reflected portions of the frequencies shifted electromagnetic radiation are filtered by the filter.

BRIEF DESCRIPTION OF THE DRAWINGS

The disclosed technique will be understood and appreciated more fully from the following detailed description taken in conjunction with the drawings in which:

FIG. 2 is a schematic illustration of an optical isolator, constructed and operative in accordance with an embodiment of the disclosed technique;

FIG. 3A is schematic illustration of the laser frequency spectrum of light outputted by the fiber laser system of FIG. 2;

FIG. 3B is schematic illustration of a spectral shape of the Band Pass Filter of FIG. 2;

FIG. 3C is a schematic illustration of the first Stokes order frequency of light after passing through the Raman shifter of FIG. 2;

FIG. 3D is a schematic illustration of the first Stokes order frequency and second Stokes order frequency of light after being back reflected through the Raman shifter of FIG. 2;

FIG. 4 is a schematic illustration of an optical isolator, constructed and operative in accordance with another embodiment of the disclosed technique;

FIG. 5 is a schematic illustration of an optical isolator, constructed and operative in accordance with a further embodiment of the disclosed technique.

DETAILED DESCRIPTION OF THE EMBODIMENTS

Figure 1A:
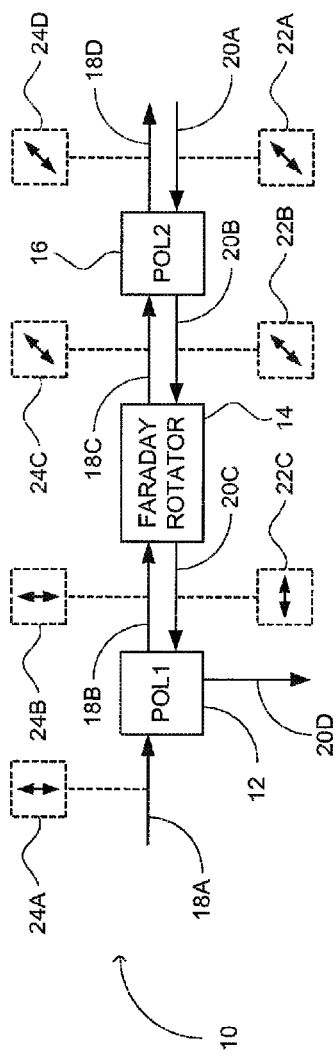
FIG. 1A is a schematic illustration of a Faraday optical isolator, constructed and operative as known in the art.
Figure 1B:
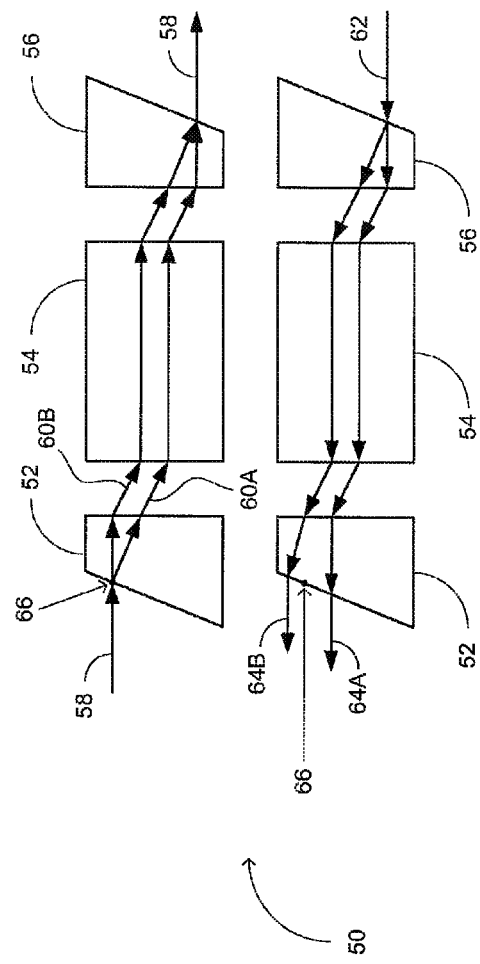
FIG. 1B is a schematic illustration of a polarity independent Faraday optical isolator, constructed and operative as known in the art.

The disclosed technique overcomes the disadvantages of the prior art by providing an optical isolator including a Band Pass Filter (BPF) and a Raman shifter. The BPF passes an incoming light beam toward the Raman shifter. The Raman shifter shifts the frequency of the incoming light beam. The BPF blocks any back-reflected shifted light, thereby isolating an optical system coupled before the BPF.

Reference is now made to FIGS. 2, 3A, 3B, 3C and 3D. FIG. 2 is a schematic illustration of an optical isolator, generally referenced 100, constructed and operative in accordance with an embodiment of the disclosed technique. FIG. 3A is schematic illustration of the laser frequency spectrum, generally referenced 150, of light outputted by the fiber laser system of FIG. 2. FIG. 3B is schematic illustration of a spectral shape, generally referenced 152, of the Band Pass Filter of FIG. 2. FIG. 3C is a schematic illustration of the first Stokes order frequency, generally referenced 154, of light after passing through the Raman shifter of FIG. 2. FIG. 3D is a schematic illustration of the first Stokes order frequency and second Stokes order frequency, generally referenced 154, of light after being back reflected through the Raman shifter of FIG. 2.

Optical isolator 100 includes a fiber laser system 102, an optical fiber 104, a Band Pass Filter (BPF) 106 and a Raman shifter 108. Band pass filter 106 is optically coupled between fiber laser system 102 and Raman shifter 108, via optical fiber 104. Alternatively, band pass filter 106 is optically coupled between fiber laser system 102 and Raman shifter 108, via free space.

Fiber laser system 102 can be any laser system having optical fibers as gain media. Alternatively, fiber laser 102 is a laser system having a semiconductor gain medium and a fiber resonator. Fiber laser system 102 produces a coherent, high brightness beam (not shown). The term "coherent light" as described herein below refers to a light having substantially uniform frequency, phase, and polarization. The light projected from fiber laser system 102 has a laser frequency $\omega_0$, as depicted in FIG. 3A.

Optical fiber 104 can be any optical fiber, such as single mode optical fiber, multi mode optical fiber, and the like. Optical fiber 104 is made up of a core (not shown), which carries the light, a cladding (not shown), which reflects the light back into the core, and, optionally, a buffer coating (not shown), which protects the core and cladding from moisture, physical damage and the like. Light is kept within the core of optical fiber 104 by total internal reflection. In this manner optical fiber 104 performs as a waveguide. Optical fiber 104 transmits light from fiber laser system 102 toward BPF 106, from BPF 106 toward Raman shifter 108 and from Raman shifter 108 onward.

BPF 106 can be any of the following, a Wavelength Division Multiplexing (WDM) coupler, a Fiber Bragg Grating (FBG), a thin-film, a dichroic mirror, or any other BPF. Alternatively, BPF 106 is replaced with a Low Pass Filter (LPF) 106 which blocks light radiation having short wavelengths and passes light radiation having longer wavelengths. The central transmission line of BPF 106 corresponds to the laser frequency $\omega_0$, thereby passing light having laser frequency $\omega_0$ with substantially no losses. BPF 106 has a linewidth of $2 \cdot \Delta\omega$, as depicted in FIG. 3B, thereby blocking light having frequency which is different than $\omega_0 \pm \Delta\omega$. In accordance with the alternative configuration (i.e., replacing BPF 106 with LPF 106), LPF 106 blocks light having frequency lower than $\omega_0 - \Delta\omega$.

Raman shifter 108 can be any of the following, a long standard fiber, a special fiber having high Raman gain, a Raman crystal, or any other Raman shifter. A long standard fiber (i.e., Silica fiber) Raman shifter 108 is adapted for an in-fiber optical isolator 100 (i.e., as opposed to free space optical isolator). The Silica fiber has low Raman gain, which is compensated for by the length of the fiber. For example, the length of long standard fiber Raman shifter 108 ranges from few meters for very high peak power level of laser system 102, and up to few hundreds meters for medium to low peak power level of laser system 102.

Raman shifter 108 made from special fiber having high gain coefficient of stimulated Raman scattering (i.e., high Raman gain) is made, for example, from Germanium doped fibers or from fibers having small effective-mode-area. That is fibers having effective-mode-area which is smaller than the laser center wavelength of radiation by 10-15 times. It is noted that the gain coefficient of stimulated Raman scattering is proportional to the intensity of the scattered light, which in turn is inversely proportional to the effective-mode-area of the light travelling in the scattering fiber. Raman shifter 108 made from Raman crystals, such as $BaWO_4$, which offer high Raman gain, is employed, for example, for free-space shifting gain.

Raman shifter 108 shifts the frequency of incoming light through Raman scattering. Raman shifter 108 shifts passing light having laser frequency $\omega_0$ into first Stokes order shifted frequency $\omega_1$, as depicted in FIG. 3C. Light which is back reflected into Raman shifter 108 can either be scattered again having its frequency shifted into second Stokes order frequency $\omega_2$, or maintain its first Stokes order frequency $\omega_1$, as depicted by FIG. 3D.

The difference between first order Stokes frequency $\omega_1$ and laser frequency $\omega_0$ is much larger than the linewidth of BPF 106 ($\omega_0 - \omega_1 \gg \Delta\omega$, as further depicted in FIG. 3C. In this manner, BPF 106 blocks back reflected light, whose frequency was shifted (i.e., at least one shift) by Raman shifter 108. Thus, optical isolator 100 substantially completely isolates fiber laser system 102 from back reflected light.

Alternatively, in case a band block filter (e.g., FBG) is employed as filter 106, it will block only the first Stokes shifted light. In this case, in order to fully isolate the optical system, all the light entering Raman shifter 108 should undergo only the first Stokes order shift (i.e., pure first Stokes order shift). In particular, no light should undergo a second Stokes order or any higher Stokes order shift within Raman shifter 108. The intensity of the light entering Raman shifter 108, for a given fiber length and area, is determined specifically for achieving this purely first stokes order shift. In case the light intensity is to low, the entering light will not undergo a full Stokes frequency shift, and at least some portion of the light will maintain its original frequency. Thereby, the unshifted light might be back-reflected through the band block filter. In case the light intensity is too high, at least a portion of the light will undergo a second Stokes order shift or higher stokes order shifts.

Reference is now made to FIG. 4, which is a schematic illustration of an optical isolator, generally referenced 200, constructed and operative in accordance with another embodiment of the disclosed technique. Optical isolator 200 includes a fiber laser system 202, an optical fiber 204, a Band Pass Filter (BPF) 206, a Raman shifter 208, a High Reflection Fiber Bragg Grating (HR FBG) 210 and a Low Reflection Fiber Bragg Grating (LR FBG) 212. Raman shifter is optically coupled between HR FPG 210 and LR FPG 212, via optical fiber 204. HR FBG 210, Raman shifter 208 and LR FBG 212 form a cavity complimented Raman shifter 214. BPF 206 is optically coupled between fiber laser system 202 and cavity complimented Raman shifter 214, via optical fiber 204. Alternatively, optical isolator is free space isolator which is optically coupled without optical fiber 204.

Each of fiber laser system 202, optical fiber 204 and BPF 206 is substantially similar to each of fiber laser system 102, optical fiber 104 and BPF 106 of FIG. 2, respectively. HR FBG 210 is a FBG which reflects substantially entirely light having frequency within the bandwidth of the FBG. LR FBG 212 is a FBG which reflects a small amount (i.e., a few percents) of light having frequency within the bandwidth of the FBG.

Raman shifter 208 is made from either long standard fiber or high Raman gain fiber (i.e., Raman shifter 208 is fiber based). Raman shifter 208 is complimented with a cavity, made from HR FBG 210 at the input and LR FBG 212 at the output. Cavity complimented Raman shifter 214 provides positive feedback to wavelengths lying in the spectral bandwidth (i.e., the reflection wavebands) of FBG 210 and 212, thereby amplifying those reflected wavelengths. Thus, cavity complimented Raman shifter 214 determines both the center wavelength and the linewidth of the output signal of optical isolator 200.

For cavity complimented Raman shifter 214 to operate, the feedback reflected from LR FBG 212 (i.e., back reflected light) has to seed the Raman interaction of the light entering from the side of HR FBG 210. This means that cavity complimented Raman shifter 214 will work only for Continuous Wave (CW) laser source or for laser source having pulses which are much longer than the cavity roundtrip time. Thus, cavity complimented Raman shifter 214 can be employed for completely shifting the frequency of CW laser sources, which do not have enough power (i.e., intensity) to be efficiently Raman shifted in a single pass with reasonable length.

Reference is now made to FIG. 5, which is a schematic illustration of an optical isolator, generally referenced 250, constructed and operative in accordance with a further embodiment of the disclosed technique. Optical isolator 250 includes a fiber laser system 252, an optical fiber 254, a Band Pass Filter (BPF) 256 and a Raman shifter 258. BPF 256 includes a back reflection monitor 260 positioned between BPF 256 and fiber laser system 202. BPF 256 is optically coupled between fiber laser system 252 and Raman shifter 258, via optical fiber 254. Alternatively, optical isolator is free space isolator which is optically coupled without optical fiber 254.

Each of fiber laser system 252, optical fiber 254, BPF 256 and Raman shifter 258, is substantially similar to each of fiber laser system 102, optical fiber 104, BPF 106 and Raman shifter 108, of FIG. 2, respectively. Back reflection monitor 260 monitors the amount of back reflected light from BPF 256 toward fiber laser system 252. Back reflection monitor 260 can perform safety shutdown of fiber laser system 252 in case of continuous or severe back reflection, which might damage fiber laser system 252. That is, in case back reflection monitor 260 determines that the back reflected light exceeds a predetermined threshold (i.e., threshold of intensity, energy, and the like), back reflection monitor 260 terminates the operation of fiber laser system for protecting it.

Back reflection monitor 260 can be coupled into optical isolator 250 in a variety of configurations, as detailed herein below. In case filter 256 is a free space dielectric filter, light rejected therefrom can be reflected and collected into a monitor port. In case filter 256 is a FBG, a fiber splitter having a selected bifurcation coupled with the monitor port may be used.

Figure 6:
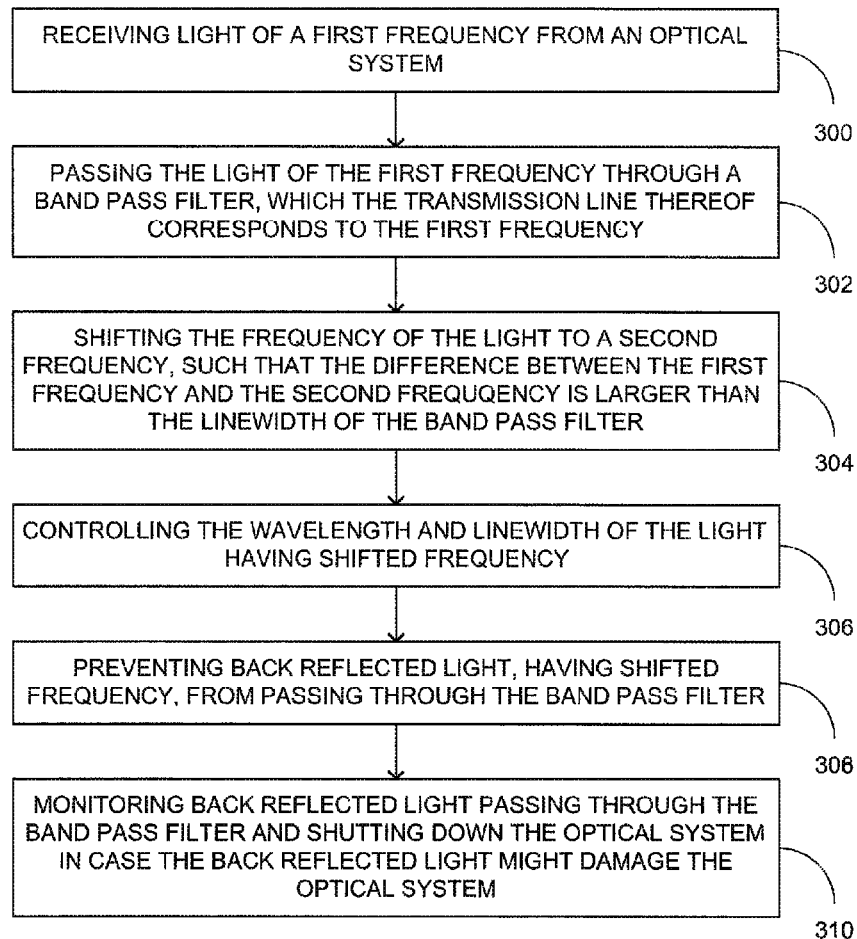
FIG. 6 is a schematic illustration of a method for optically isolating a fiber laser system, operative in accordance with yet another embodiment of the disclosed technique.

Reference is now made to FIG. 6, which is a schematic illustration of a method for optically isolating an optical system, operative in accordance with another embodiment of the disclosed technique. In procedure 300, light (i.e., electromagnetic radiation) of a first frequency is received from an optical system. The light is received via an optical fiber or via freespace. The optical system can be for example, a laser system. The frequency of the received light is substantially coherent. Alternatively, the received light is of a predetermined range of frequencies. With reference to FIGS. 2 and 3A, fiber laser system 102 outputs light having laser frequency $\omega_0$ through optical fiber 104.

In procedure 302, the light of the first frequency is passed through a BPF, which the transmission line thereof corresponds to the first frequency. As the transmission line of the BPF corresponds to the frequency of the received light, the received light passes through the BPF with substantially no losses. Alternatively, the BPF is replaced with an LPF or any other filter (e.g., FBG) which transmits light having the first frequency with substantially no losses. With reference to FIGS. 2 and 3B, BPF 106 passes light outputted from fiber laser system 102 with substantially no losses.

In procedure 304, the frequency of the light is shifted to a second frequency, such that the difference between the first frequency and the second frequency is larger than the linewidth of the band pass filter. The frequency of the light is shifted by employing, for example a Raman shifter. In the alternative case of employing a different filter than a BPF, the second frequency is chosen such that it is filtered by the employed filter. With reference to FIGS. 2 and 3C, Raman shifter 108 substantially entirely shifts the light having laser frequency $\omega_0$, such that substantially no residue of light having laser frequency $\omega_0$ remains. For example, the light is shifted to the first order Stokes frequency $\omega_1$. The difference between first Stoke order frequency $\omega_1$ and laser frequency $\omega_0$ is larger than the linewidth of the band pass filter, $\omega_0 - \omega_1 \gg \Delta\omega$.

In procedure 306, the wavelength and linewidth of the light having shifted frequency (i.e., light outputted from the Raman shifter) is controlled. The linewidth and wavelength can be controlled, for example, by a cavity surrounding the Raman shifter. With reference to FIG. 4, cavity complimented Raman shifter 214 controls the wavelength and linewidth of the light having shifted frequency.

In procedure 308, back reflected light, having shifted frequency, is prevented from passing through the band pass filter. The shifted frequency of the back reflected light is not within the linewidth of the band pass filter and is therefore prevented from passing through the band pass filter. With reference to FIGS. 2 and 3D, BPF 106 prevents back reflected light having shifted frequency (i.e., frequency shifted away from the laser frequency $\omega_0$) from passing toward fiber laser system 102.

In procedure 310, back reflected light passing through the band pass filter is monitored and the optical system is shut down in case the back reflected light exceeds a predetermined threshold and might damage the optical system. Back reflected light which passed through the BPF, either because the frequency thereof was not fully shifted from $\omega_0$ to $\omega_1$, or because the BPF did not function properly, is monitored. In case the back reflected light might damage the optical system, the optical system is shut down. With reference to FIG. 5, monitor 260 monitors back reflected light passing through BPF 256. Monitor 260 shuts down fiber laser system 252 in case the back reflected light passing through BPF 256 might damage fiber laser system (i.e., exceeds a pre-determined threshold of some parameter, such as intensity or energy).

It will be appreciated by persons skilled in the art that the disclosed technique is not limited to what has been particularly shown and described hereinabove. Rather the scope of the disclosed technique is defined only by the claims, which follow.

The invention claimed is:

1. An optical isolator for optically isolating an optical system, the optical system outputting electromagnetic radiation at predetermined ranges of frequencies, the optical isolator comprising:
a filter optically coupled via a fiber after the output of said optical system, said filter receiving said electromagnetic radiation of predetermined ranges of frequencies from said optical system, said filter allowing only electromagnetic radiation of said predetermined ranges of frequencies to pass therethrough, and blocking electromagnetic radiation outside said predetermined ranges of frequencies; and
a Raman shifter, optically coupled via a fiber after the output of said filter, said Raman shifter receiving said electromagnetic radiation of predetermined ranges of frequencies from said filter, said Raman shifter shifting the frequencies of said electromagnetic radiation through Raman scattering into a plurality of shifted frequencies outside said predetermined ranges of frequencies, for enabling filtering said plurality of shifted frequencies in case of back reflections toward said optical system, wherein said plurality of shifted frequencies traveling in free space after said Raman shifter, wherein a portion of said plurality of shifted frequencies are back-reflected via free space toward said Raman shifter and said filter from an external object in an environment of said optical system located after said Raman shifter.

2. The optical isolator of claim 1, wherein said filter is selected from the list consisting of:
a band pass filter;
a low pass filter;
a band block filter;
a wavelength division multiplexing coupler;
a fiber Bragg grating;
a thin-film; and
a dichroic mirror.

3. The optical isolator of claim 1, wherein said optical system is a laser optical system outputting electromagnetic radiation at a predetermined frequency.

4. The optical isolator of claim 1, wherein said Raman shifter is selected from the list consisting of:
a silica fiber;
a Germanium doped fiber;
a fiber having effective-mode-area which is smaller than a center wavelength of said electromagnetic radiation by 10-15 times; and
a Raman crystal.

5. The optical isolator of claim 1, further comprising a complementing cavity for said Raman shifter, wherein said complementing cavity comprising:
a high reflection fiber Bragg grating, reflecting substantially entirely light having frequency within a spectral bandwidth thereof, coupled between said filter and said Raman shifter; and
a low reflection fiber Bragg grating, reflecting only a few percentage of light having frequency within the a spectral bandwidth thereof, coupled with said the output of said Raman shifter,
wherein said spectral bandwidth of said high reflection fiber Bragg grating is the same as said spectral bandwidth of said low reflection fiber Bragg grating,
and wherein said complementing cavity and said Raman shifter determining a center frequency and a linewidth of said shifted electromagnetic radiation.

6. The optical isolator of claim 1, further comprising a back reflection monitor coupled between said filter and said optical system, said back reflection monitor monitoring the amount of back reflected electromagnetic radiation passing through said filter toward said optical system, said back reflection monitor shutting down said optical system in case said back reflected electromagnetic radiation exceeds a predetermined threshold.

7. A method for optically isolating an optical system, the method comprising the procedures of:
receiving electromagnetic radiation of a predetermined ranges of frequencies from an output of an optical system via a fiber;
passing said electromagnetic radiation through a filter located after said output of said optical system, said filter only allowing electromagnetic radiation of said predetermined ranges of frequencies to pass therethrough, and blocking electromagnetic radiation outside said predetermined ranges of frequencies;
after an output of said filter, shifting by a Raman shifter the frequencies of said electromagnetic radiation through Raman scattering
into a plurality of shifted frequencies outside said predetermined ranges of frequencies, for enabling filtering said plurality of shifted frequencies in case of back reflections toward said optical system, wherein said plurality of shifted frequencies traveling in free space after said Raman shifter, wherein said back-reflected portion of said plurality of shifted frequencies being back-reflected via free space toward said Raman shifter and said filter from an external object in an environment of said optical system located after said Raman shifter.

8. The method of claim 7, wherein said procedure of shifting includes the sub-procedure of determining the center frequency and the linewidth of said shifted electromagnetic radiation by providing positive feedback to selected waveband of wavelengths.

9. The method of claim 7, further comprising the procedures of:

monitoring back reflected portions of said frequencies shifted electromagnetic radiation, reflected toward said optical system; and in case said back reflected portions of said frequencies shifted electromagnetic radiation, reflected toward said optical system, exceeding a predetermined threshold, shutting down said optical system.

* * * * *